United States Patent
Hasler et al.

(10) Patent No.: US 11,056,885 B2
(45) Date of Patent: Jul. 6, 2021

(54) METHOD OF PROVIDING POWER SUPPORT TO AN ELECTRICAL POWER GRID

(71) Applicant: ABB Power Grids Switzerland AG, Baden (CH)

(72) Inventors: Jean-Philippe Hasler, Västerås (SE); Jan Kheir, Västerås (SE); Philippe Maibach, Muhen (CH)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 83 days.

(21) Appl. No.: 16/343,650

(22) PCT Filed: Oct. 21, 2016

(86) PCT No.: PCT/EP2016/075387
§ 371 (c)(1),
(2) Date: Apr. 19, 2019

(87) PCT Pub. No.: WO2018/072843
PCT Pub. Date: Apr. 26, 2018

(65) Prior Publication Data
US 2019/0273379 A1    Sep. 5, 2019

(51) Int. Cl.
*H02J 3/00* (2006.01)
*H02J 3/30* (2006.01)
(Continued)

(52) U.S. Cl.
CPC .............. *H02J 3/30* (2013.01); *H02M 5/4585* (2013.01); *H02P 9/105* (2013.01); *H02H 9/02* (2013.01); *Y02E 60/16* (2013.01)

(58) Field of Classification Search
CPC ......... H02J 3/30; H02M 5/4585; H02P 9/105; Y02E 60/16; H02H 9/02
(Continued)

(56) References Cited

U.S. PATENT DOCUMENTS 5,642,006 A * 6/1997 Cech .................. H02J 3/42
307/87
6,140,803 A * 10/2000 Hurley ............... H02J 3/42
307/87
(Continued)

FOREIGN PATENT DOCUMENTS

DE         198 27 259 A1    12/1999
DE    10 2007 007 913 A1    8/2008
(Continued)

OTHER PUBLICATIONS

International Preliminary Report on Patentability, issued in PCT/EP2016/075387, dated Jan. 21, 2019.
(Continued)

*Primary Examiner* — Ryan Jager
(74) *Attorney, Agent, or Firm* — Slater Matsil, LLP (57) ABSTRACT

A method of providing power support to an electrical power grid is provided. The power support is provided by an arrangement including a synchronous machine connected to a converter, the converter in turn being connected to the electrical power grid. The method is performed in a control device controlling the arrangement and includes: receiving feedback from one or both of the electrical power grid and the synchronous machine, and controlling the converter such that power support is provided to or absorbed from the electrical power grid by means of the synchronous machine based on the received feedback. A control device, arrangement, computer program and computer program products are also provided.

21 Claims, 3 Drawing Sheets

(51) Int. Cl.
  *H02M 5/458* (2006.01)
  *H02P 9/10* (2006.01)
  *H02H 9/02* (2006.01)
(58) Field of Classification Search
  USPC .......................................................... 307/82
  See application file for complete search history.

(56) References Cited

U.S. PATENT DOCUMENTS

| | | | | |
|---|---|---|---|---|
| 8,384,319 | B2* | 2/2013 | Marken | H02J 3/30 |
| | | | | 318/280 |
| 2009/0167088 | A1 | 7/2009 | González et al. | |
| 2010/0031667 | A1 | 2/2010 | Hoffmann et al. | |
| 2010/0032964 | A1 | 2/2010 | Hoffmann et al. | |
| 2011/0148114 | A1* | 6/2011 | Garcia | H02J 3/381 |
| | | | | 290/44 |
| 2011/0285130 | A1* | 11/2011 | Thisted | H02J 3/386 |
| | | | | 290/44 |
| 2011/0309805 | A1* | 12/2011 | Matveev | H02J 3/1892 |
| | | | | 322/61 |
| 2012/0310426 | A1* | 12/2012 | Tarnowski | F03D 7/0284 |
| | | | | 700/287 |
| 2015/0168981 | A1* | 6/2015 | Skliutas | H02J 3/1828 |
| | | | | 323/204 |
| 2015/0260159 | A1* | 9/2015 | Jimenez Buendia | F03D 7/0284 |
| | | | | 290/44 |
| 2020/0235580 | A1* | 7/2020 | McDonnell | G05B 19/042 |

FOREIGN PATENT DOCUMENTS

| | | |
|---|---|---|
| EP | 2 708 737 A1 | 3/2014 |
| WO | WO 2008/098911 A1 | 8/2008 |

OTHER PUBLICATIONS

International Search Report, issued in PCT/EP2016/075387, dated Jun. 26, 2017.
Written Opinion of the International Preliminary Examining Authority, issued in PCT/EP2016/075387, dated Sep. 11, 2018.
Written Opinion of the International Searching Authority, issued in PCT/EP2016/075387, dated Jun. 26, 2017.
Xu et al. "Simulation and analysis of back-to-back PWM converter for flywheel energy storage system", ICEMS 2012, IEEE, Oct. 21, 2012, pp. 1-5, XP032298043.
Zhang et al., "Flywheel Energy Storage System Design for Distribution Network", PES 2000, Singapore, IEEE, Jan. 23, 2000, pp. 2619-2623, XP000967188.

* cited by examiner

METHOD OF PROVIDING POWER SUPPORT TO AN ELECTRICAL POWER GRID

TECHNICAL FIELD

The technology disclosed herein relates generally to the field of electrical power systems, and more specifically to a method of providing power support to an electrical power grid, a control device, an arrangement, a computer program and a computer program product.

BACKGROUND

Renewable energy sources such as e.g. wind or solar power generation, are substituting fossil-fuel and nuclear based energy sources for the production of electricity. For the case of wind power generation, wind turbines are often coupled to an electrical power grid through power electronic converters so that the wind turbine generator may rotate with an angular speed independent of the grid frequency. This is necessary since the wind speed varies considerably within an operating range of the wind turbine, hence causing rotor speed to vary.

The electrical power grid may experience grid voltage transients, some of which are combatted by the inertia of the rotating masses connected to the grid. These rotating masses may, for instance, be synchronous generators connected to the electrical power grid. By definition, the inertia of these masses results in an inherent active power output response during frequency transients. The inertia thus combats these grid transient conditions and helps maintaining a power balance between the total power output of the grid (i.e. load) and the total power supplied to the grid (from e.g. power plants).

One drawback of the renewable energy sources is that they do not or only to a very limited extent contribute to the network frequency stability as normally provided by the mechanical inertia of the electrical machines connected to the grid. The inertia may become critically small and the electrical power grid system may therefore get unstable. The current solutions for increasing the inertia are to install a synchronous condenser or energy storage such as Battery Energy Storage System (BESS), flywheel, or the like to the grid. For windfarm installations, wherein inverter-connected wind turbines as such do not provide inertia, it is proposed to use the mechanical energy stored in the blades/rotor to provide synthetic inertia. All these solutions are expensive in that additional machinery has to be purchased.

SUMMARY

An objective of the present invention is to solve or at least alleviate the above mentioned problems. A particular objective is to enable provision of inertia (in particular synthetic inertia) to an electrical power grid in a cost-efficient way. Another particular objective is to provide means for controlling e.g. a synchronous generator (e.g. speed thereof) that is used for providing the inertia. These objectives and others are achieved by the methods, devices, computer programs and computer program products according to the appended independent claims, and by the embodiments according to the dependent claims.

The objective is according to an aspect achieved by a method of providing power support (in particular active power support) to an electrical power grid. The power support is provided by an arrangement comprising a synchronous machine connected to a converter, the converter in turn being connected to the electrical power grid. The method may be performed in a control device controlling the arrangement. The method comprises: receiving feedback from one or both of: the electrical power grid and the synchronous machine, and controlling, based on the received feedback, energy stored in a rotating mass of the synchronous machine.

The method provides several advantages. For instance, the invention provides the possibility of using (or re-using) existing energy sources for providing synthetic inertia to the electrical power grid. This is a less costly way than e.g. purchasing and running battery systems. The method enables a stable and reliable operation of the electrical power grid, also when using renewable energy sources for the electrical power generation.

In some embodiments, the receiving feedback comprises receiving rotational speed of a rotating mass of the synchronous machine and frequency of the electrical power grid. The controlling comprises controlling rotational speed of a rotating mass by controlling the frequency of the synchronous machine. That is, the rotational speed is controlled such as to increase or decrease the rotational speed of the rotating mass by controlling the frequency of the synchronous machine.

In some embodiments, the controlling comprises controlling a rotational speed of a rotating mass of the synchronous machine to be within a defined interval including its nominal rotational speed.

In some embodiments, the controlling comprises controlling a rotational speed of a rotating mass of the synchronous machine such as to be synchronized with amplitude, frequency and/or phase angle of the electrical power grid.

In some embodiments, the method comprises detecting a fault condition in the electrical power grid and bypassing the converter by means of a breaker device.

In some embodiments, the method comprises detecting a fault condition in the converter and bypassing the converter by means of a breaker device.

The objective is according to an aspect achieved by a computer program for a control device for controlling provision of synthetic inertia to an electrical power grid. The computer program comprises computer program code, which, when run on processing circuitry of the control device causes the control device to perform the method as above.

The objective is according to an aspect achieved by a computer program product comprising a computer program as above, and a computer readable means on which the computer program is stored.

The objective is according to an aspect achieved by a control device for controlling provision of synthetic inertia to an electrical power grid. The synthetic inertia is provided by an arrangement comprising a synchronous machine connected to a converter, the converter in turn being connected to the electrical power grid. The control device is configured to control the arrangement by: receiving feedback from one or both of the electrical power grid and the synchronous machine, and controlling the converter such that synthetic inertia is provided to or absorbed from the electrical power grid by means of the synchronous machine based on the received feedback.

In various embodiments, the control device is configured to perform any of the embodiments of the method as described earlier.

The objective is according to an aspect achieved by an arrangement for providing power support to an electrical power grid. The arrangement comprises a synchronous machine connected to a converter, the converter in turn being connectable to the electrical power grid. The arrangement further comprising a control device configured to: receive feedback from one or both of the electrical power grid and the synchronous machine, and to control, based on the received feedback, energy stored in a rotating mass of the synchronous machine.

In various embodiments, the control device of the arrangement is configured to perform any of the embodiments of the method as described earlier.

In some embodiments, the arrangement comprises a breaker device arranged to bypass the converter upon detection of a fault condition.

Further features and advantages of the present invention will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The invention will now be described more fully hereinafter with reference to the drawings, in which certain embodiments of the invention are illustrated. The present invention may however be embodied in many different forms and should not be construed as limited to the embodiments set forth herein; rather, these embodiments are provided by way of example so as to render this disclosure thorough and complete, and will fully convey the scope of the invention to those skilled in the art.

The various features of the embodiments described in the following may be combined in different ways, also in ways not explicitly mentioned herein.

Briefly, the present invention suggests the use of a converter, in particular a power electronic (PE) converter, for providing the desired inertia to the electrical power grid using energy stored in the rotating mass of e.g. a synchronous machine (SM). That is, the synchronous machine is providing synthetic inertia to the electrical power grid through an "interface" in the form of a PE converter.

Inertia may be seen as a parameter that represents the capability of e.g. synchronous machines to store and inject their kinetic energy to the grid. The level of inertia influences the rate of change of frequency (i.e. frequency gradient) and transient frequency values during a grid transient condition. The transient value of the grid frequency is important, because an increase of transient deviation of frequency caused by an inertia decrease can raise the risk of reaching values which are dangerous for the system stability.

Figure 1:
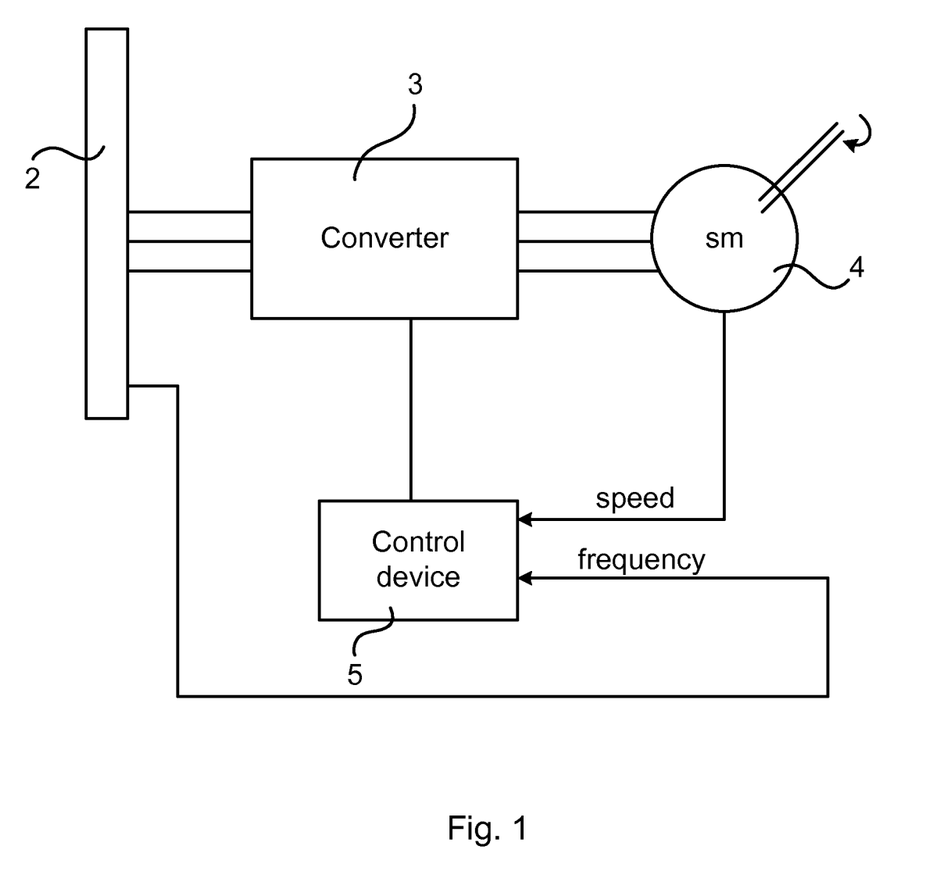
FIG. 1 illustrates a first embodiment of an arrangement according to the present invention.

FIG. 1 illustrates a first embodiment of an arrangement according to the present invention. A power system 1 comprises an electrical power grid 2, in the following also denoted grid 2. The grid 2 delivers electricity from suppliers to consumers and may, for instance, be an alternating-current (AC) electric power supply having medium voltages or high voltage levels, e.g. voltages in the approximate range of 10-20 kV.

The power system 1 further comprises a synchronous machine 4 (e.g. rotating synchronous generator) comprising a rotating mass. Its stored kinetic energy may be controlled such as to provide power support to the grid 2. Such power support is important for stability of the grid 2. The power system 1 may also comprise an additional rotating mass. For instance, a flywheel may be provided that is mechanically coupled to the synchronous machine 4.

In a conventional system, such synchronous machine would be connected directly to the grid, or via a transformer. However, the amount of active power and energy which can be used to provide the inertia into the grid is not optimal for this prior art scenario as the power output of the synchronous machine cannot be fully controlled. Normally, synchronous machines are equipped with a so called Power System Stabilizer (PSS) which is used for limiting oscillation magnitude and for increasing the damping of the oscillations during transient conditions in the grid. It is noted that this feature primarily influences the reactive power generated or absorbed by the synchronous machine, not the active power. Further, the kinetic energy of the rotating mass cannot be fully utilized as it will depend on the grid frequency which should be kept constant. In contrast to this, the present invention suggests introducing a converter 3, which may be used for influencing both the reactive power and active power generated or absorbed at the point of connection to the grid.

The power system 1 according to the invention thus comprises a converter 3, in particular a power electronic converter 3 and a control device 5 for the control thereof. The converter 3 is connected between the synchronous machine 4 and the grid 2 to which the power support is to be provided. The converter 3 is arranged to provide "synthetic" inertia using the energy stored in the rotating mass of the synchronous machine 4. The converter 3 (or rather the control device 5 controlling it) controls the amount of power transferred to or absorbed from the grid 2.

The synchronous machine 4 comprises a rotating mass providing rotational power, which is converted into electric power at terminals of the synchronous machine 4. Phase and frequency of an alternating current (AC) at the terminals are related to angular velocity of the rotating mass. It is noted that the synchronous machine 4 may absorb power as well as generate power, and the flow of power depends on the frequency deviation. Hence, the terminals of the synchronous machine 4 may be denoted input terminals when absorbing power (acting as load) and output terminals when generating power.

The power system 1 comprises a control device 5 for controlling the converter 3. The control device 5 may receive parameter inputs from the synchronous machine 4 (e.g. voltage and/or speed thereof) and from the grid 2 (e.g. voltage and/or frequency thereof).

In an aspect, the invention may take advantage of decommissioned power plant generators, wherein such generators are kept in operation for providing (or absorbing) power. In some embodiments thus, the converter 3 is provided and connected between a synchronous machine 4 of a decommissioned power plant and the grid 2 to which the power is to be provided (or from which the power is to be absorbed) in a controlled manner.

Exemplary operation and use of the converter 3 is given next.

In normal operation, the rotational speed of the rotating mass of the synchronous machine 4 (also denoted speed of machine in the following) should be equal to or below its nominal speed. If the synchronous machine 4 is arranged to provide frequency support, then the initial rotational speed of the machine should be set in proportion to nominal frequency of grid 2. Such frequency support may, for instance, be needed in the case of loss of generation or loss of load in the grid 2. The amount of energy to be injected or absorbed by the synchronous machine 4 depends on the minimum/maximum rotational speed of the synchronous machine 4. The maximum rotational speed of the synchronous machine 4 is normally limited by the mechanical design of the rotating mass. The minimum rotational speed of the synchronous machine 4 may be limited for various reasons, for instance, due to a circuit breaker protecting the synchronous machine 4, fault current, circuit breaker current capability, excitation system, etc. It is noted that the stored energy of the rotating mass is proportional to the square of the rotating mass and thus, for example, a decrease of 50% of the rotational speed from nominal rotational speed means that the remaining energy in the rotating mass would be 25% of the nominal energy at nominal speed.

By providing the converter 3 as an "interface" between the grid 2 and the synchronous machine 4 the power provided to or absorbed from the grid 2 can be controlled. In particular, by varying the frequency of the synchronous machine 4 (e.g. by varying the rotational speed of the rotating mass thereof) the energy stored in the synchronous machine 4 can be reduced by injecting it as electrical energy to the grid 2. Conversely, if energy is to be reduced in the grid 2, the frequency of the synchronous machine 4 is varied such that (kinetic) energy is instead stored in the synchronous machine 4.

Figure 2:
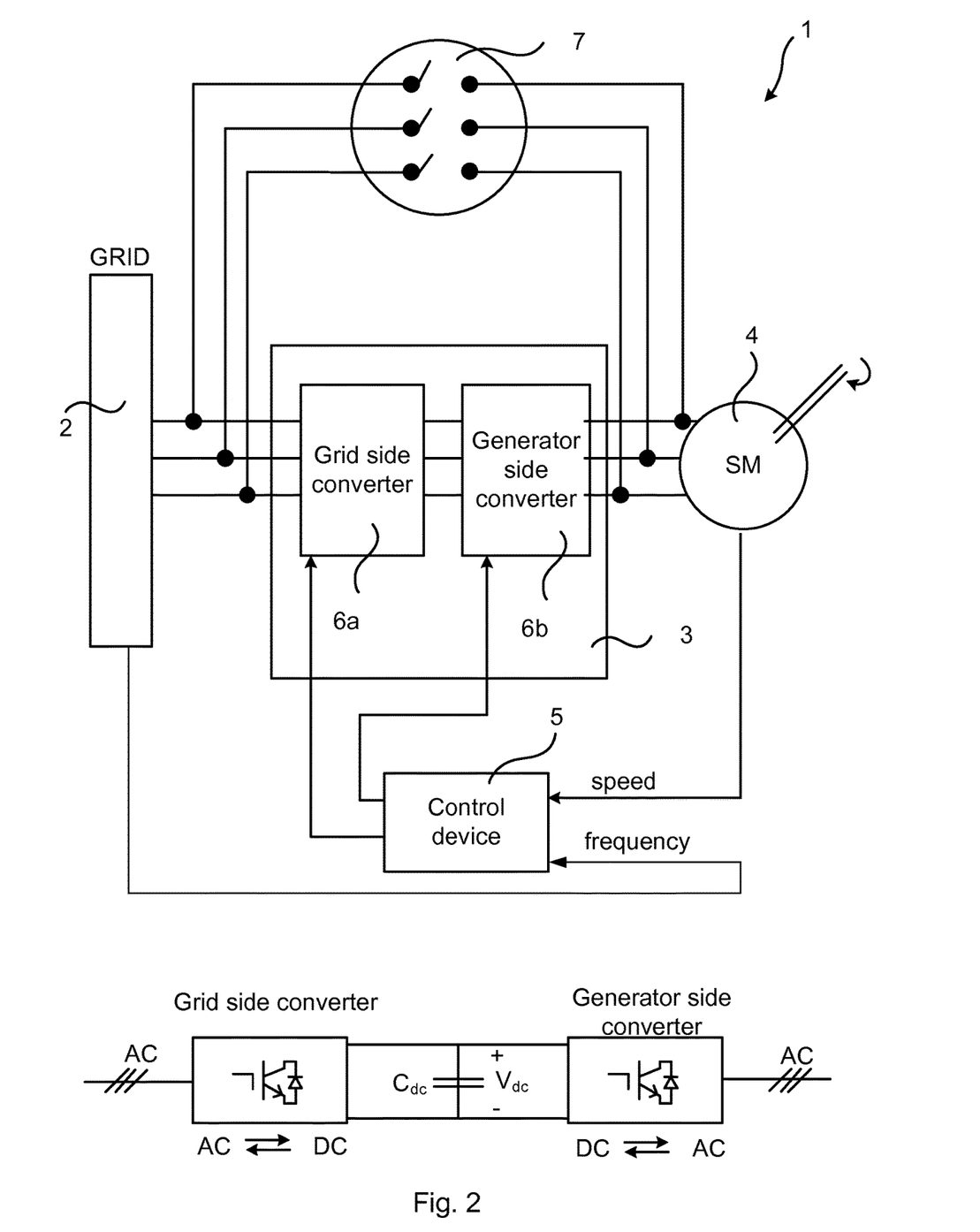
FIG. 2 illustrates further embodiments of an arrangement according to the present invention.

FIG. 2 illustrates an embodiment of the present invention. In this embodiment, the converter 3 comprises a grid side converter 6a and a generator side converter. The converter 3 may be arranged in a back-to-back configuration comprising a direct current (DC) link, as shown at bottommost part of FIG. 2. In other embodiments, the converter 3 may be a matrix converter or a modular multilevel matrix converter. The converter 3 may be a static frequency converter providing bi-directional power flow.

The rotational speed of the synchronous machine 4 can, as indicated above, be controlled by the control device 5. For instance, the speed of the synchronous machine 4 can be decreased by controlling the voltage and frequency of the generator side converter 6b. Active power may be exchanged by means of the grid side converter 6a, which is controlled such as to keep the DC link constant. The kinetic energy provided is proportional to the square of the frequency change of its rotating mass. In prior art, the grid frequency f is directly coupled to the rotational speed of the synchronous machine and thus to the active power balance. In contrast, the invention provides a decoupling of the grid frequency with the rotational speed of the synchronous machine 4 during grid transient situations and enables to exploit more energy from the rotating mass compared to the prior art (i.e. without converter) and to utilize this to stabilize the grid in an improved way.

FIG. 2 also discloses a feature whereby the converter 3 can be bypassed. The converter 3 may be bypassed by means of a bypass device 7, which may, for instance, be a circuit breaker. As an example on when the bypass device 7 might be needed and used is when (or if) the synchronous machine 4 needs to supply a high fault current, for instance, in case of a fault occurring in the grid 2. The converter 3 can hence be bypassed temporarily upon need by controlling the bypass device 7. It is noted that even when bypassed, the converter 3 is still able to provide reactive power, i.e. act as a STATCOM.

Typically a synchronous machine provides much more short circuit current capability than a power electronic converter. For protection reasons, higher short circuit current is needed than what a converter could provide. Assuming that the synchronous machine is normally operated synchronously to the grid (i.e. have same amplitude and phase as the grid voltage). If a fault is detected, potentially high short circuit current is expected by protection relays to flow from the arrangement disclosed herein. The converter itself may not be able to provide a required fault current to allow protection relays to trip. Activating the bypass device 7 in such situations allow the synchronous machine 4 to provide fault current as if the converter 3 was not installed between synchronous machine 4 and grid 2. In this situation, the synthetic inertia functionality is not available but also not required either.

The two functionalities of providing power (synthetic inertia) and providing fault current may be controlled by the control device 5. Synthetic inertia (and thus the converter 3 being in operation) is required during frequency deviations, fault current (and thus the bypass device 7 in operation) is required if the grid voltage dips below a certain threshold.

Figure 3:
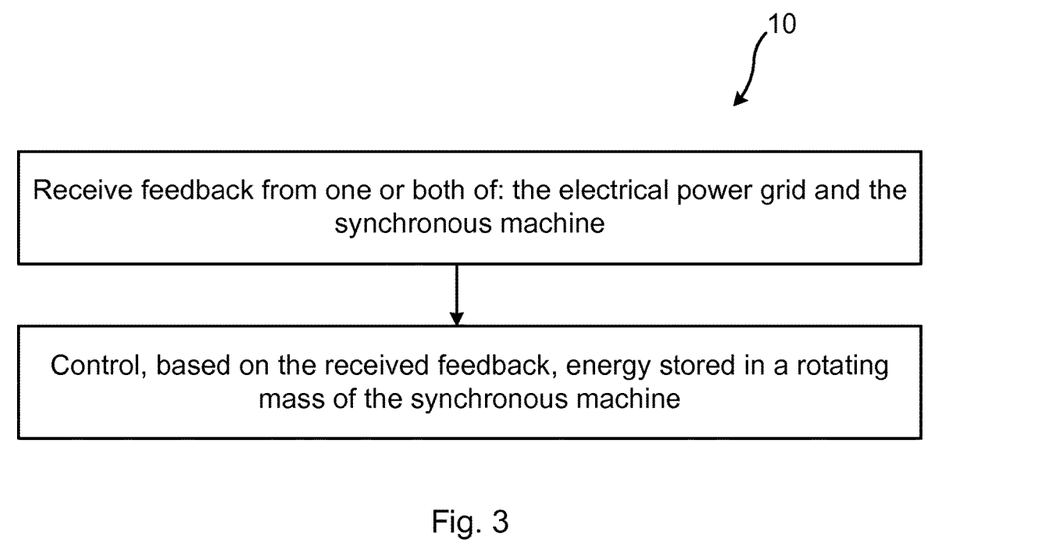
FIG. 3 illustrates a flow chart over steps of a method in a control device in accordance with the present invention.

FIG. 3 illustrates a flow chart over steps of a method in a control device 5 in accordance with the invention. A method to of providing power support to an electrical power grid 2 is provided. The power support is provided by an arrangement 3, 4 comprising a synchronous machine 4 connected to a converter 3, the converter 3 in turn being connected to the electrical power grid 2. The arrangement 3, 4 is thus controlled for providing power support to an electrical power grid 2. The method to is performed in a control device 5 controlling the arrangement 3, 4.

The method to comprises receiving it feedback from one or both of the electrical power grid 2 and the synchronous machine 4. Various feedback parameters can be used in different combinations, for instance, rotational speed of the synchronous machine 4, frequency of the electrical power grid 2, voltage magnitude of the grid 2, power reference from a Remote Area Controller, voltage amplitude of the synchronous machine 4.

The method to comprises controlling 12, based on the received feedback, energy stored in a rotating mass of the synchronous machine 4. The amount of energy stored in the synchronous machine 4 is controlled by means of the converter 3. For instance, the converter 3 can be controlled such that the rotational speed of the synchronous machine 4 is increased or decreased depending on need, e.g. depending on conditions in the electrical power grid 2 (e.g. frequency disturbances in the electrical power grid 2).

The method 10 is a cost-efficient way of providing stability in the electrical power grid 2. The synchronous machine 4 is a conventional and reliable way of converting rotational power to electrical power and the other way around. The invention renders the power output of the synchronous machine 4 highly controllable by interfacing it with the converter 3, which in turn is connected to the electrical power grid 2 which is to be balanced upon need.

In an embodiment, the receiving ii feedback comprises receiving rotational speed of a rotating mass of the synchronous machine 4 and frequency of the electrical power grid 2, and wherein the controlling 12 comprises controlling rotational speed of the rotating mass by controlling the frequency of the synchronous machine.

In some embodiments, the controlling comprises increasing or decreasing the rotational speed of the rotating mass by controlling the frequency of the synchronous machine.

In an embodiment, the controlling 12 comprises controlling a rotational speed of a rotating mass of the synchronous machine 4 to be within a defined interval including its nominal rotational speed. The upper limit of the defined interval may, for instance be the maximum speed of the synchronous machine 4 and the lower limit of the defined interval may, for instance, be the minimum speed of the synchronous machine 4. The synchronous machine 4 may be designed for a maximum speed which is higher than its nominal speed, and which can be reached for short durations. In this embodiment, energy stored in the synchronous machine 4 can be exchanged with the electrical power grid 2.

In an embodiment, the controlling 12 comprises controlling a rotational speed of a rotating mass of the synchronous machine such as to be synchronized with amplitude, frequency and/or phase angle of the electrical power grid. In this embodiment, energy stored in the synchronous machine 4 can be used for providing frequency support to the electrical power grid 2.

In an embodiment, the method 10 comprises detecting a fault condition in the electrical power grid 2 and bypassing the converter 3 by means of a breaker device 7.

In an embodiment, the method 10 comprises detecting a fault condition in the converter 3 and bypassing the converter 3 by means of a breaker device 7.

In the two above embodiments, the method 10 ensures that the synchronous machine 4 can be used for quickly supplying high fault current to the electrical power grid 2.

Figure 4:
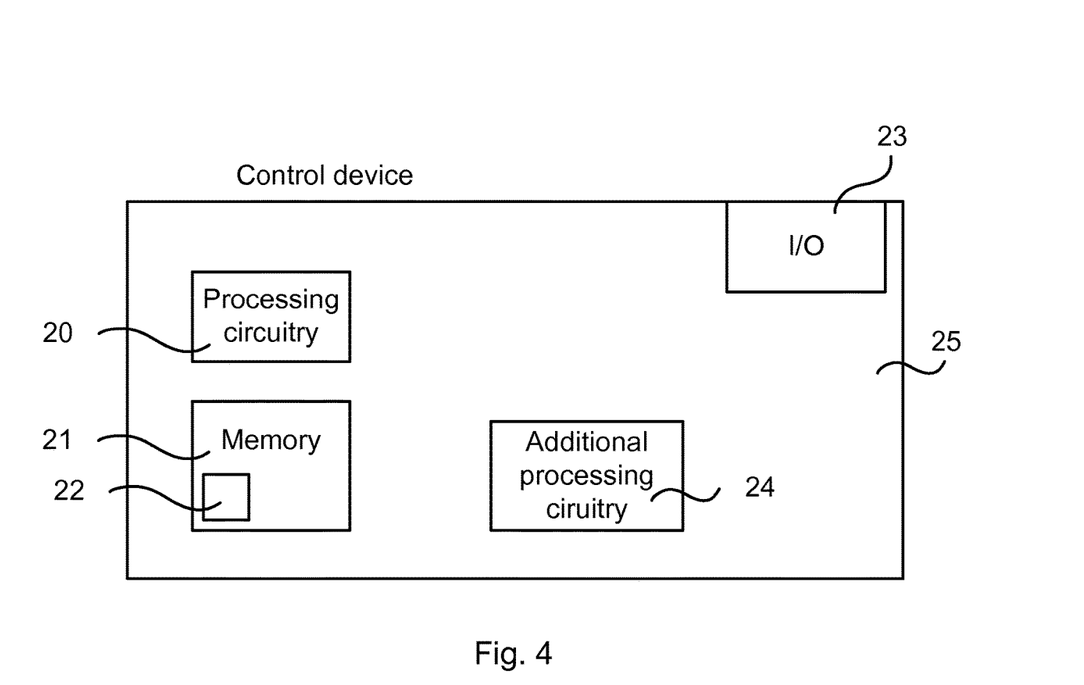
FIG. 4 illustrates a control device in accordance with the present invention.

FIG. 4 illustrates the control device 5 for controlling the converter 3 and hence the power provided to or absorbed from the grid 2. The control device 5 comprises means for implementing methods of the present invention. The control device 5 comprises processing circuitry 20 using any combination of one or more of a central processing unit (CPU), multiprocessor, microcontroller, digital signal processor (DSP), etc. capable of executing software instructions stored in a memory 21, which can thus be a computer program product 21. The processing circuitry 20 may be provided as at least one application specific integrated circuit (ASIC) or field programmable gate array (FPGA). The processing circuitry 20 can be configured to execute any of the various embodiments of the methods as described herein, e.g. in relation to FIG. 3. Particularly, the processing circuitry 20 is configured to cause the control device 5 to perform a set of operations, i.e. steps of the described method 10. It is noted that the processing circuitry 20 may be available remotely, e.g. in a cloud computing environment. The described embodiments are thus not limited to any particular number of devices on which the instructions performed by the control device 5 may be executed. The method may be performed on a control device residing in a cloud computational environment. Although a single processing circuitry 20 is illustrated, the processing circuitry 20 may be distributed among plurality of devices.

In some embodiments, the control device 5 is arranged to establish that there is a fault in the grid 2 and to control the converter 3 such as to provide fault current.

In an aspect thus, a control device 5 of a power system 1 is provided for controlling provision of synthetic inertia to an electrical power grid 2, the synthetic inertia being provided by an arrangement 3, 4 comprising a synchronous machine 4 connected to a converter 3. The converter 3 in turn is connected to the electrical power grid 2. The control device 5 is configured to control the arrangement 3, 4 by:

receiving feedback from one or both of the electrical power grid 2 and the synchronous machine 4, and controlling, based on the received feedback, energy stored in a rotating mass of the synchronous machine 4. The control device 5 may control the converter 3 to thereby control the stored energy.

In various embodiments, the control device 5 as above is configured to perform the method 10 as described herein, e.g. in relation to FIG. 3.

In some embodiments, the arrangement 3, 4, 5 comprises a breaker device 7 arranged to bypass the converter 3 upon detection of a fault condition.

Still with reference to FIG. 4, the memory 21 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

A data memory (not explicitly shown) may also be provided for reading and/or storing data during execution of software instructions in the processing circuitry 20. The data memory can be any combination of random access memory (RAM) and read only memory (ROM).

The present invention also encompasses a computer program product 21 comprising a computer program 22 for implementing embodiments of the method as described, and a computer readable means on which the computer program 22 is stored. The computer program product 21 may be any combination of random access memory (RAM) or read only memory (ROM). The computer program product 21 may also comprise persistent storage, which for example can be any single one or combination of magnetic memory, optical memory or solid state memory.

The invention provides a number of advantages, as will be described next. As mentioned earlier, the invention may reduce costs by enabling re-use of existing energy sources (e.g. of decommissioned power plants). This is more cost-efficient than e.g. use of battery systems.

Frequency nadir and frequency zenith, i.e. boundary conditions for the steady-state frequency range, can be limited by means of the invention. The arrangement 3, 4 that have been described can be controlled such as to provide increase in synthetic inertia before frequency nadir is reached. For instance, upon loosing a power generator the frequency in the grid drops and the arrangement 3, 4 can be used for quickly inject sufficient power during an initial period during this power generation loss to minimize the frequency drop caused thereby.

The arrangement 3, 4 according to the invention is a cost-efficient way of meeting power peak shaving.

Oscillation frequencies constitute a restraint on power transmission capability and by damping such power oscillations an increased power transmission capability is obtained. The arrangement 3, 4 according to the invention may be used also for such power oscillating damping.

Still another feature and advantage of the present invention is that it may be used for reactive power compensation.

Negative sequence compensation is controllable by means of the arrangement according to the invention.

The invention provides an improved fault ride-through at low voltage. In a prior art solution, wherein the synchronous machine is connected directly to the grid, there is a risk that the synchronous machine is not synchronized to the grid (i.e. is out of step) after a fault having been cleared. The synchronous machine may then need to be disconnected from the grid. In contrast to this, implementing the arrangement 3, 4 according to the invention, there is no need to disconnect the synchronous machine (when connected to the grid 2 via the converter 3) after a cleared fault.

The arrangement 3, 4 according to the invention can be used for controlling the appropriate current injection during fault conditions in the grid.

The invention has mainly been described herein with reference to a number of embodiments. However, as is appreciated by a person skilled in the art, other embodiments than the particular ones disclosed herein are equally possible within the scope of the invention, as defined by the appended patent claims.

The invention claimed is:

1. A method of providing synthetic inertia for frequency support to an electrical power grid, the support being provided by an arrangement comprising a synchronous machine connected to a power electronic (PE) converter, the PE converter being connected to the electrical power grid, the method being performed in a control device controlling the arrangement, the method comprising:
    setting an initial rotational speed of a rotating mass of the synchronous machine in proportion to a nominal frequency of the electrical power grid;
    receiving feedback from the electrical power grid and the synchronous machine; and
    controlling, based on the received feedback, energy stored in the rotating mass such that synthetic inertia is provided to the electrical power grid via the PE converter, wherein controlling the energy stored in the rotating mass controls power provided to the electrical grid from the synchronous machine and controls power absorbed from the electrical grid to the synchronous machine.

2. The method as claimed in claim 1, wherein receiving the feedback comprises receiving a rotational speed of the rotating mass of the synchronous machine and frequency of the electrical power grid, and wherein the controlling comprises controlling the rotational speed of the rotating mass by controlling the frequency of the synchronous machine.

3. The method as claimed in claim 2, wherein the controlling comprises increasing or decreasing the rotational speed of the rotating mass by controlling the frequency of the synchronous machine.

4. The method as claimed in claim 3, wherein the controlling comprises controlling the rotational speed of the rotating mass of the synchronous machine to be equal to or below a nominal rotational speed thereof.

5. The method as claimed in claim 3, wherein the controlling comprises controlling the rotational speed of the rotating mass of the synchronous machine to be synchronized with an amplitude, a frequency and/or a phase angle of the electrical power grid.

6. The method as claimed in claim 3, further comprising detecting a fault condition in the electrical power grid and bypassing the PE converter by a breaker device.

7. The method as claimed in claim 2, wherein the controlling comprises controlling the rotational speed of the rotating mass of the synchronous machine to be equal to or below a nominal rotational speed thereof.

8. The method as claimed in claim 2, wherein the controlling comprises controlling the rotational speed of the rotating mass of the synchronous machine to be synchronized with an amplitude, a frequency and/or a phase angle of the electrical power grid.

9. The method as claimed in claim 2, further comprising detecting a fault condition in the electrical power grid and bypassing the PE converter by a breaker device.

10. The method as claimed in claim 1, wherein the controlling comprises controlling a rotational speed of the rotating mass of the synchronous machine to be equal to or below a nominal rotational speed thereof.

11. The method as claimed in claim 10, wherein the controlling comprises controlling the rotational speed of the rotating mass of the synchronous machine to be synchronized with an amplitude, a frequency and/or a phase angle of the electrical power grid.

12. The method as claimed in claim 1, wherein the controlling comprises controlling a rotational speed of the rotating mass of the synchronous machine to be synchronized with an amplitude, a frequency and/or a phase angle of the electrical power grid.

13. The method as claimed in claim 1, further comprising detecting a fault condition in the electrical power grid and bypassing the PE converter by a breaker device.

14. The method as claimed in claim 1, further comprising detecting a fault condition in the PE converter and bypassing the PE converter by a breaker device.

15. A non-transitory computer readable medium with a computer program thereon, the computer program comprising computer program code, which, when run on processing circuitry of the control device causes the control device to perform the method according to claim 1.

16. A control device for controlling provision of synthetic inertia to an electrical power grid for frequency support, the synthetic inertia being provided by an arrangement comprising a synchronous machine connected to a power electronic (PE) converter, the PE converter being connected to the electrical power grid, the control device being configured to control the arrangement by:
    setting an initial rotational speed of a rotating mass of the synchronous machine in proportion to a nominal frequency of the electrical power grid;
    receiving feedback from the electrical power grid and the synchronous machine; and
    controlling the PE converter such that synthetic inertia is provided to the electrical power grid by the synchronous machine based on the received feedback, wherein controlling the PE converter controls power provided to the electrical grid from the synchronous machine and controls power absorbed from the electrical grid to the synchronous machine.

17. The control device as claimed in claim 16, wherein receiving the feedback comprises receiving a rotational speed of the rotating mass of the synchronous machine and frequency of the electrical power grid, and wherein the controlling comprises controlling the rotational speed of the rotating mass by controlling the frequency of the synchronous machine.

18. A circuit for providing power support to the electrical power grid, the circuit comprising the control device as claimed in claim 16, wherein the PE converter and the synchronous machine are connected to the control device.

19. The circuit as claimed in claim 18, wherein receiving the feedback comprises receiving a rotational speed of the rotating mass of the synchronous machine and frequency of the electrical power grid, and wherein the controlling comprises controlling the rotational speed of the rotating mass by controlling the frequency of the synchronous machine.

20. The circuit as claimed in claim 18, further comprising a breaker device arranged to bypass the PE converter upon detection of a fault condition.

21. A method of providing synthetic inertia for frequency support to an electrical power grid, the support being provided by an arrangement comprising a synchronous machine connected to a converter, the converter being connected to the electrical power grid, the method being performed in a control device controlling the arrangement, the method comprising:

setting an initial rotational speed of a rotating mass of the synchronous machine in proportion to a nominal frequency of the electrical power grid;

receiving feedback from the electrical power grid and the synchronous machine;

controlling, based on the received feedback, energy stored in the rotating mass such that synthetic inertia is provided to the electrical power grid, wherein controlling the energy stored in the rotating mass controls power provided to the electrical grid from the synchronous machine and controls power absorbed from the electrical grid to the synchronous machine; and detecting a fault condition in the electrical power grid or the converter and bypassing the converter by a breaker device in response to detecting the fault condition.

* * * * *